(12) United States Patent
Aoki

(10) Patent No.: US 8,174,791 B2
(45) Date of Patent: May 8, 2012

(54) MAGNETIC HEAD AND INFORMATION STORAGE DEVICE

(75) Inventor: Kenichiro Aoki, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 120 days.

(21) Appl. No.: 12/750,569

(22) Filed: Mar. 30, 2010

(65) Prior Publication Data

US 2010/0246047 A1 Sep. 30, 2010

(30) Foreign Application Priority Data

Mar. 31, 2009 (JP) ................. 2009-086265

(51) Int. Cl.
*G11B 21/21* (2006.01)
(52) U.S. Cl. ................................. 360/125.31
(58) Field of Classification Search .............. 360/125.31
See application file for complete search history.

(56) References Cited

U.S. PATENT DOCUMENTS

| 5,991,113 | A | 11/1999 | Meyer et al. | |
|---|---|---|---|---|
| 7,466,516 | B2 * | 12/2008 | Lille ......................... | 360/234.5 |
| 7,573,682 | B2 * | 8/2009 | Pust et al. ................. | 360/294.7 |
| 7,589,936 | B1 * | 9/2009 | McFadyen et al. ........ | 360/123.1 |
| 7,729,088 | B2 * | 6/2010 | Kurita et al. .............. | 360/234.4 |
| 7,898,767 | B2 * | 3/2011 | Yamanaka et al. ........ | 360/125.31 |
| 7,957,085 | B2 * | 6/2011 | Tanaka et al. ............ | 360/59 |
| 7,961,429 | B2 * | 6/2011 | Kurihara et al. ......... | 360/125.31 |
| 2005/0018348 | A1 * | 1/2005 | Lille et al. ................. | 360/128 |
| 2005/0068676 | A1 * | 3/2005 | Lille et al. ................. | 360/126 |
| 2007/0139818 | A1 * | 6/2007 | Shimazawa et al. ....... | 360/126 |

FOREIGN PATENT DOCUMENTS

| JP | 04-305809 | 10/1992 |
|---|---|---|
| JP | 05-020635 | 1/1993 |
| JP | 2004-335069 | 11/2004 |
| JP | 2005-285236 | 10/2005 |
| JP | 2006-139820 | 6/2006 |
| JP | 2008-027504 | 2/2008 |

OTHER PUBLICATIONS

Office Action mailed on Dec. 13, 2011 in corresponding Japanese Application No. JP 2009-086265.

* cited by examiner

*Primary Examiner* — Mark Blouin
(74) *Attorney, Agent, or Firm* — Knobbe, Martens, Olson & Bear, LLP

(57) ABSTRACT

According to one embodiment, a magnetic head includes a magnetic pole layer including a magnetic pole extending along a layer, a coil layer configured to adjoin the magnetic pole layer and including a plurality of conductor patterns constituting a part of a coil wound around the magnetic pole and a resin which fills up a gap between the conductor patterns, a heater layer configured to adjoin the coil layer and including a heater extending in the heater layer via an area along a coil-forming region in which the conductor patterns in the coil layer are formed and an area along a no-coil region off the coil-forming region, and a transition-reluctant portion in that part of the no-coil region which adjoins the heater and having a glass transition temperature higher than that of the resin or not having any glass transition temperature.

9 Claims, 5 Drawing Sheets

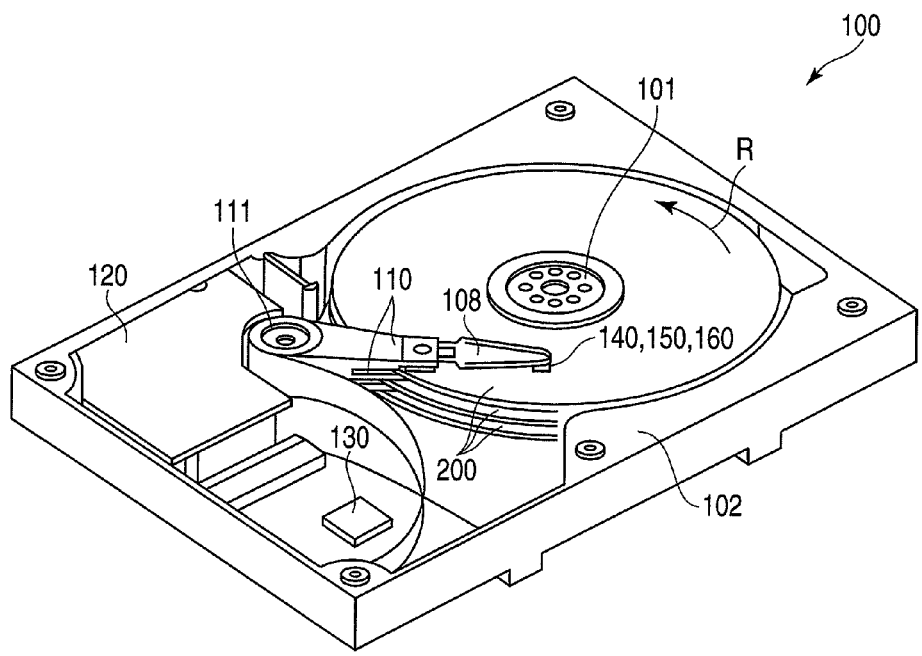
F I G. 1
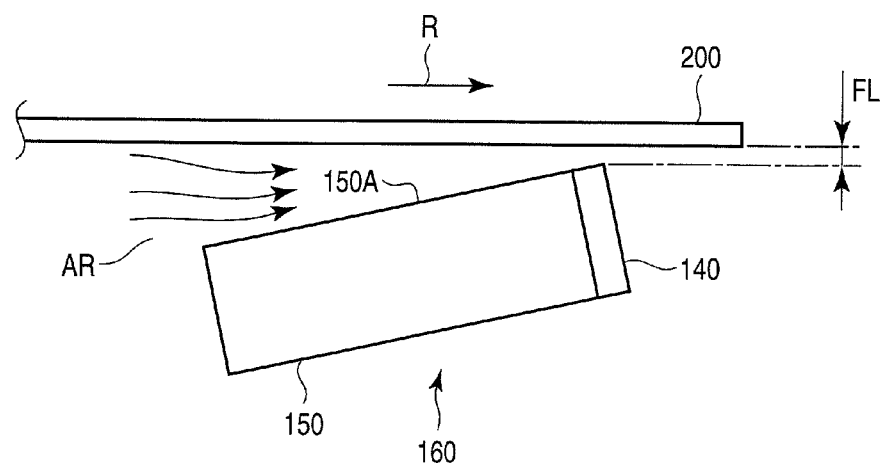
F I G. 2

(Comparative Example)

(Comparative example)

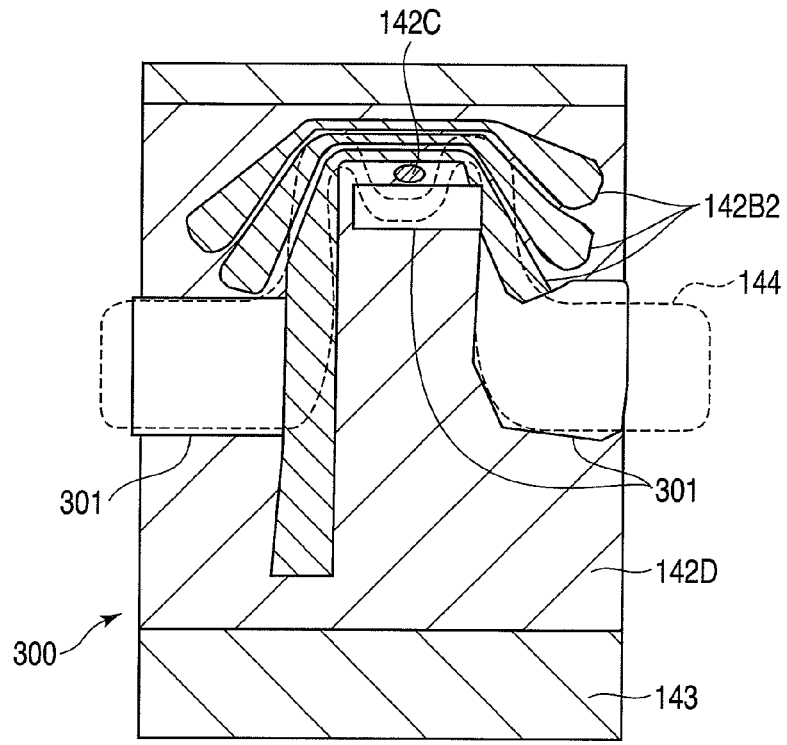
F I G. 7
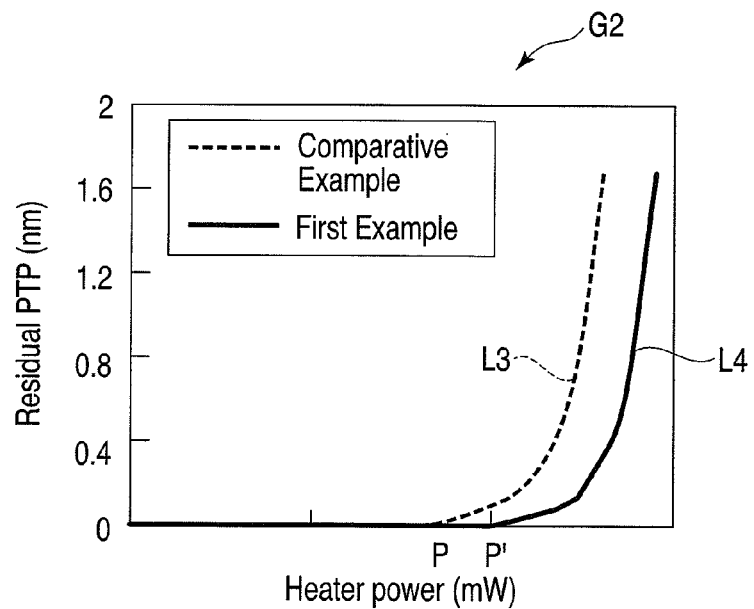
F I G. 8

MAGNETIC HEAD AND INFORMATION STORAGE DEVICE

CROSS-REFERENCE TO RELATED APPLICATIONS

This application is based upon and claims the benefit of priority from Japanese Patent Application No. 2009-086265, filed Mar. 31, 2009, the entire contents of which are incorporated herein by reference.

BACKGROUND

1. Field

One embodiment of the invention relates to a magnetic head configured to record information to a recording medium, such as a magnetic disk, and an information storage device mounted with the magnetic head.

2. Description of the Related Art

A lot of information is routinely processed in the field of computers. A hard disk drive (HDD) is used as one type of information storage device for recording and reproducing such information. The HDD contains a magnetic disk, for use as a disk storage medium in which information is recorded, and a magnetic head for recording information to the disk.

In recent years, the recording density of HDDs has been increasing with the reduction of the distance between a magnetic head and magnetic disk (i.e., flying height of the head) during information recording or reproduction. Currently, the flying height of the magnetic head is set to about 10 nm. It is generally known, however, that the flying height is not constant.

For example, the head flying height varies depending on changes in temperature, atmospheric pressure, etc., around the magnetic head. The head generally comprises a coil through which a current corresponding to information to be recorded is passed during recording. If the current is passed through the coil to perform the recording, the coil produces heat and thermally expands. When this is done, the degree of expansion of the coil changes as the current corresponding to the information to be recorded changes. Accordingly, the flying height of the head changes with the change in the degree of thermal expansion.

Such a change in the flying height may cause a collision between the magnetic disk and head, reduction in recording performance, etc. Thereupon, techniques for thermal deformation are proposed in, for example, Jpn. Pat. Appln. KOKAI Publication No. 5-20635, U.S. Pat. No. 5,991,113, and Jpn. Pat. Appln. KOKAI Publications Nos. 2004-335069, 2008-27504, and 2005-285236. According to these techniques, a heater is built in a magnetic head, and its heating value is suitably adjusted so that the head can be thermally deformed to compensate for the change in its flying height.

In this case, the magnetic head is mounted on a slider, which is formed with an air-bearing surface whereby the head is caused to fly to the aforesaid flying height above the magnetic disk. Since the air-bearing surface of the slider is subject to manufacturing errors, the flying height of the head frequently varies according to each manufactured head. The variation of the flying height can be eliminated by adjusting the flying height by the aforementioned heating.

According to the above-described techniques in which the flying height of the magnetic head is adjusted by the thermal deformation by means of the heater, if electric power supplied to the heater is not higher than a certain level, the thermal deformation that is caused depending on its level is canceled when the power supply to the heater is stopped. If the power supplied to the heater is high, however, a stress heavier than the yield point may act on a part of the magnetic head, thereby causing plastic deformation. If such plastic deformation occurs, a protrusion (residual pole tip protrusion or PTP) inevitably remains on a part of the head after the power supply to the heater is stopped. This residual PTP serves to reduce an unadjusted flying height before the power supply. If the residual PTP is large, therefore, an allowance (heater stroke) cannot be secured for the adjustment based on the thermal deformation by the heater, so that the adjustment inevitably becomes impossible. The higher the power supplied to the heater, the larger the residual PTP is. In many cases, according to the aforementioned techniques, therefore, an upper limit is provided for the power supplied to the heater, in order to suppress the residual PTP. Actually, the residual PTP is large compared to the power supplied to the heater, so that the upper limit of the supplied power cannot be set to be very high.

As mentioned before, the flying height, which depends on the air-bearing surface of the slider on which the magnetic head is mounted, frequently varies according to each head because of manufacturing errors. According to the aforementioned techniques, this variation in the flying height attributable to the manufacturing errors can be eliminated. If the original flying height before the thermal deformation is great, however, the variation may not be able to be eliminated by supplied power lower than the upper limit. In many cases, those magnetic heads whose flying height variations are too great to be eliminated by supplied power lower than the upper limit are discarded as defective products, so that the yield rate of heads is reduced. Accordingly, there is a demand for the development of magnetic heads of which the residual PTP relative to the power supplied to the heater is suppressed.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exemplary perspective view showing an internal configuration of a hard disk drive (HDD) according to one embodiment of the invention;

FIG. 2 is an exemplary view typically showing a magnetic head/slider and magnetic disk of the HDD;

FIG. 7 is an exemplary sectional view similar to FIG. 4, showing a magnetic head according to a second embodiment of the invention; and FIG. 8 is an exemplary diagram comparatively showing residual PTPs of the magnetic heads according to Comparative Example and the embodiment.

DETAILED DESCRIPTION

Figure 3:
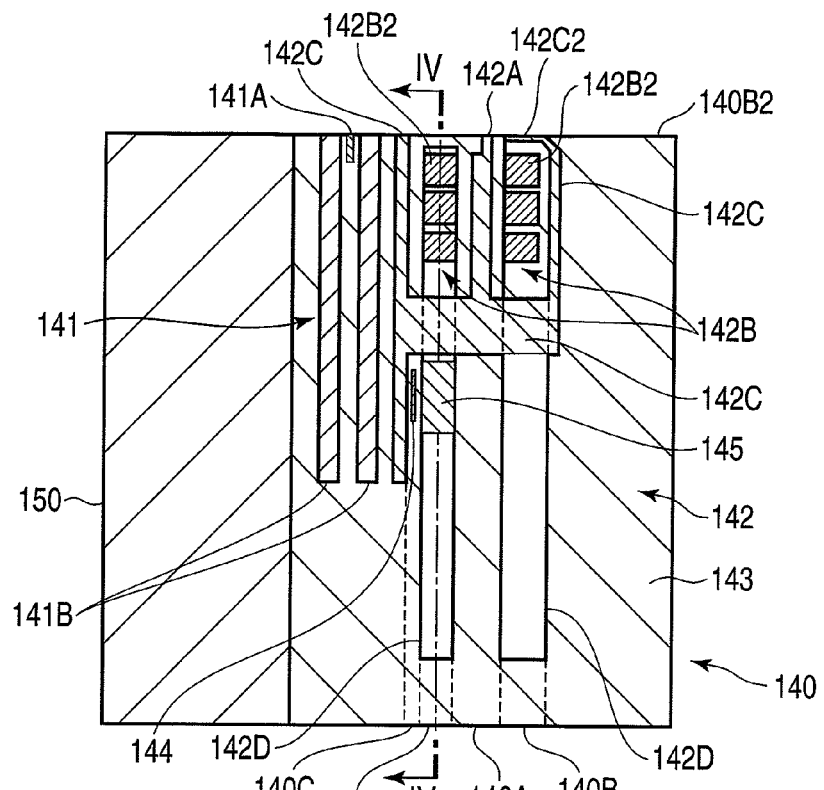
FIG. 3 is an exemplary sectional view showing an internal configuration of a magnetic head shown in FIG. 2.

Various embodiments according to the invention will be described hereinafter with reference to the accompanying drawings. In general, according to one embodiment of the invention, there is provided a magnetic head comprising: a magnetic pole layer comprising a magnetic pole extending along a layer; a coil layer configured to adjoin the magnetic pole layer and comprising a plurality of conductor patterns constituting a part of a coil wound around the magnetic pole and a resin which fills up a gap between the conductor patterns; a heater layer configured to adjoin the coil layer and comprising a heater extending in the heater layer via an area along a coil-forming region in which the conductor patterns in the coil layer are formed and an area along a no-coil region off the coil-forming region; and a transition-reluctant portion in that part of the no-coil region which adjoins the heater and having a glass transition temperature higher than that of the resin or not having any glass transition temperature.

A magnetic head and an information storage device according to one embodiment of the invention will now be described in detail with reference to the accompanying drawings.

FIG. 1 shows an internal configuration of a hard disk drive (HDD) according to a first embodiment as the information storage device. As shown in FIG. 1, an HDD 100 is incorporated in a host device, such as a personal computer, and used as information storage means of the host device.

The HDD 100 comprises a housing 102 substantially in the form of a rectangular box. A plurality of (e.g., three) magnetic disks 200 for use as disk recording media are arranged in spaced layers in the housing 102. The housing 102 contains a spindle motor 101, which supports and rotates the three disks 200 in the direction of arrow R.

The housing 102 further contains a plurality of swing arms 110, actuator 120, and control circuit 130 (mentioned later). The arms 110 move along the obverse or reverse surface of each magnetic disk 200. The actuator 120 actuates the swing arms 110. A suspension 108 extends from each arm 110, and a magnetic head/slider 160 is supported on the distal end of the suspension. The magnetic head/slider 160 comprises a magnetic head 140 and slider 150. The head 140 records and reproduces information to and from the magnetic disks 200. The head 140 is mounted on the slider 150.

The swing arms 110 are pivotably supported in the housing 102 by a bearing 111. By pivoting within a predetermined angular range around the bearing 111, the arms 110 move the magnetic head/slider 160 along the obverse or reverse surface of each magnetic disk 200.

The control circuit 130 controls the movement of the swing arms 110 and the information recording and reproduction by the magnetic head 140 mounted on the magnetic head/slider 160. The control circuit 130 also serves for the exchange of information with the host device.

FIG. 2 is a schematic view showing the magnetic head/slider 160. If each magnetic disk 200 rotates in the direction of arrow R, airflow AR is produced and passes between the head/slider 160 and a surface of the magnetic disk 200. Thereupon, airflow AR produces a pressure between the disk 200 and head/slider 160. This pressure corresponds to the shape of an air-bearing surface (ABS) 150A formed on the disk side of the slider 150. The magnetic head/slider 160 flies at a constant height from the surface of the disk 200, based on the balance between the pressure produced by airflow AR and a force with which the head/slider 160 is pressed toward the disk 200 by the suspension 108. Hereinafter, the sides on which airflow AR gets in and out will be referred to as inflow and outflow sides, respectively.

The magnetic head 140 is formed on the outflow-side end face of the slider 150. As the magnetic head/slider 160 flies, the head 140 also flies at a flying height FL corresponding to the shape of the air-bearing surface 150A from the magnetic disk 200.

FIG. 3 shows a section of the magnetic head 140 perpendicular to the surface of the magnetic disk 200. In FIG. 3, the topside corresponds to the side of the disk 200. The magnetic head 140 comprises a read element 141 and write element 142, which are layered from the inflow side in the order named. The read element 141 reproduces information from the disk 200, while the write element 142 records information to the disk 200. The peripheries of the read and write elements 141 and 142, including gaps between them and between their respective constituent elements, are covered by alumina as an insulating material 143. The magnetic head 140 is configured so that the constituent elements of the read and write elements 141 and 142 and layers including some of the constituent elements are laminated to one another.

The read element 141 comprises a magneto-resistive effect element 141A and two magnetic shield layers 141B. The resistance value of the element 141A changes according to the size of its surrounding magnetic field. The shield layers 141B laterally sandwich the element 141A and double as electrodes. The write element 142 comprises a main magnetic pole 142A, coil 142B, yoke 142C, and resist resin 142D.

The main magnetic pole 142A is a magnetic pole that extends along the inflow-side end face of the slider 150 and generates lines of magnetic force from its end portion on the side of the magnetic disk 200. The coil 142B is wound around the main magnetic pole 142A. If a current is supplied to the coil 142B, a magnetic field is produced within the main magnetic pole 142A. The coil 142B is configured so that a plurality of conductor patterns 142B2 formed with the main magnetic pole 142A between them are connected to one another to form a coil that is wound around the pole 142A.

The yoke 142C is formed of the same material that forms the main magnetic pole 142A. The yoke 142C forms a magnetic path through which the returned lines of magnetic force from the main magnetic pole 142A pass. The yoke 142C and pole 142A constitutes a magnetic circuit in which the lines of magnetic force form a loop.

The resist resin 142D fills up a gap between the conductor patterns 142B2 that form the coil 142B. The resist resin 142D spreads over no-coil regions of respective forming surfaces of the conductor patterns 142B2 off coil forming regions, as well as over the coil-forming regions.

The main magnetic pole 142A of the present embodiment is an example of the magnetic pole in the aforementioned basic form. A layer (magnetic pole layer 140A) in which the main magnetic pole 142A is formed within the insulating material 143 (alumina) is an example of a magnetic pole layer. Further, the coil 142B is an example of a coil in the basic form, and the conductor patterns 142B2 are an example of conductor patterns in the basic form. Furthermore, the resist resin 142D of the present embodiment is an example of a resin in the basic form. A layer (coil layer 140B) that comprises the conductor patterns 142B2 and resist resin 142D is an example of a coil layer in the basic form.

In general, as mentioned before, the flying height of a magnetic head changes depending on the ambient temperature and atmospheric pressure and change of current supplied to the coil of the write element of the head. Further, the flying height varies according to each head because of manufacturing errors of the air-bearing surface of the slider.

In the present embodiment, the magnetic head 140 comprises a built-in heater 144, which suitably causes the head 140 to be thermally deformed, in order to eliminate the variation in the flying height. A heater layer 140C formed with the heater 144 of the present embodiment is disposed in the insulating material 143. The heater 144 is located between the yoke 142C and coil layer 140B on the inflow side. More specifically, the heater 144 is located substantially in the middle of a region that combines the read and write elements 141 and 142, with respect to the direction of lamination. In this location, the heater 144 extends like a band along the inflow-side coil layer 140B or the following path.

Figure 4:
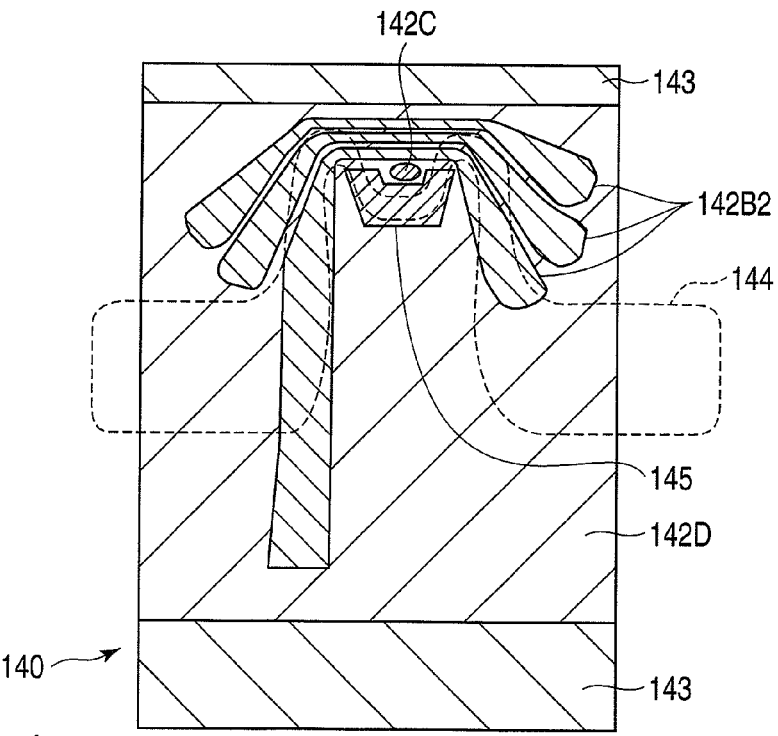
FIG. 4 is an exemplary sectional view of the magnetic head taken along line IV-IV of FIG. 3 and from the outflow side.

FIG. 4 is a schematic sectional view of the magnetic head taken along line IV-IV of FIG. 3 and from the outflow side. As shown in FIG. 4, the heater 144 extends along the path within the heater layer 140C that passes through an area along the coil-forming region of the inflow-side coil layer 140B and an area along the no-coil region off the coil-forming region. This path is a bypass that circumvents the vicinity of an end face 140B2 on the side of the magnetic disk 200. This arrangement is provided to prevent an undesired magnetic field from being formed in the yoke 142C when a current is supplied to the heater 144 if the aforesaid path passes through the end face 140B2 of the yoke 142C.

When the heater 144 is powered, it produces heat, whereupon the interior of the magnetic head 140, especially its part in which the heater 144 is located, is heated. Consequently, the head 140 undergoes thermal deformation around the location of the heater 144. According to this magnetic head 140, electric power supplied to the heater 144 is suitably adjusted to regulate the amount of thermal deformation of the head 140, whereby the flying height of the head is adjusted.

As shown in FIGS. 3 and 4, a nonmagnetic member 145 is disposed adjacent to the heater 144 in the no-coil region of the inflow-side coil layer 140B. The nonmagnetic member 145 is shaped after the heater 144 and is formed of a nonmagnetic material without a glass transition temperature, such as alumina or copper. The nonmagnetic member 145 is an example of a transition-reluctant portion in the basic form.

Figure 5B:
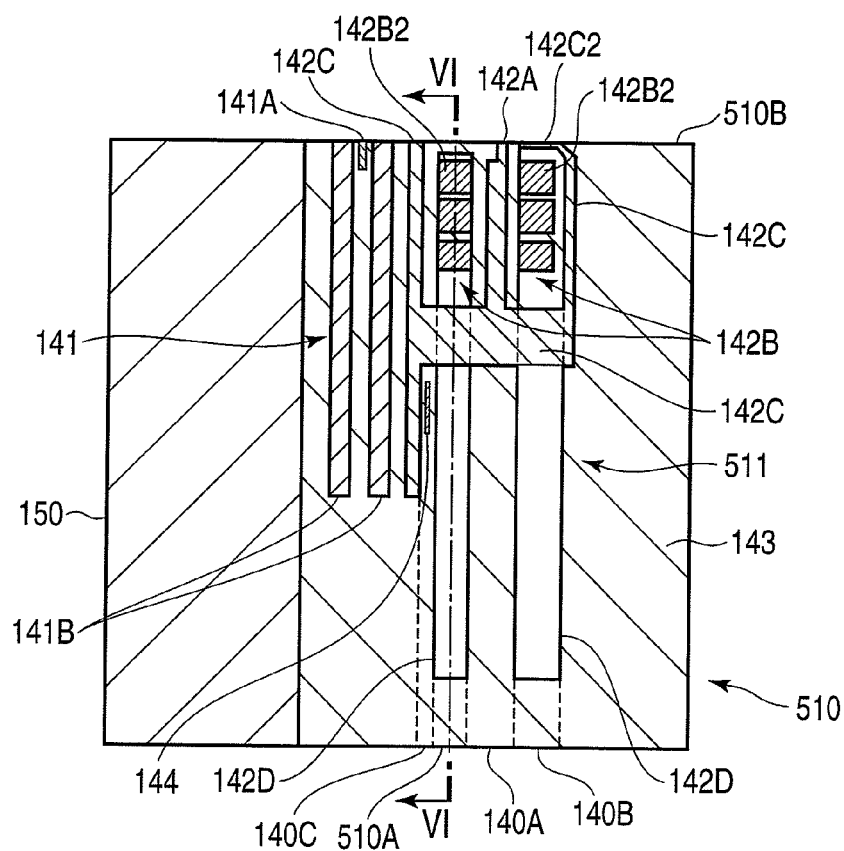
FIG. 5B is an exemplary sectional view of the magnetic head according to Comparative Example.
Figure 6:
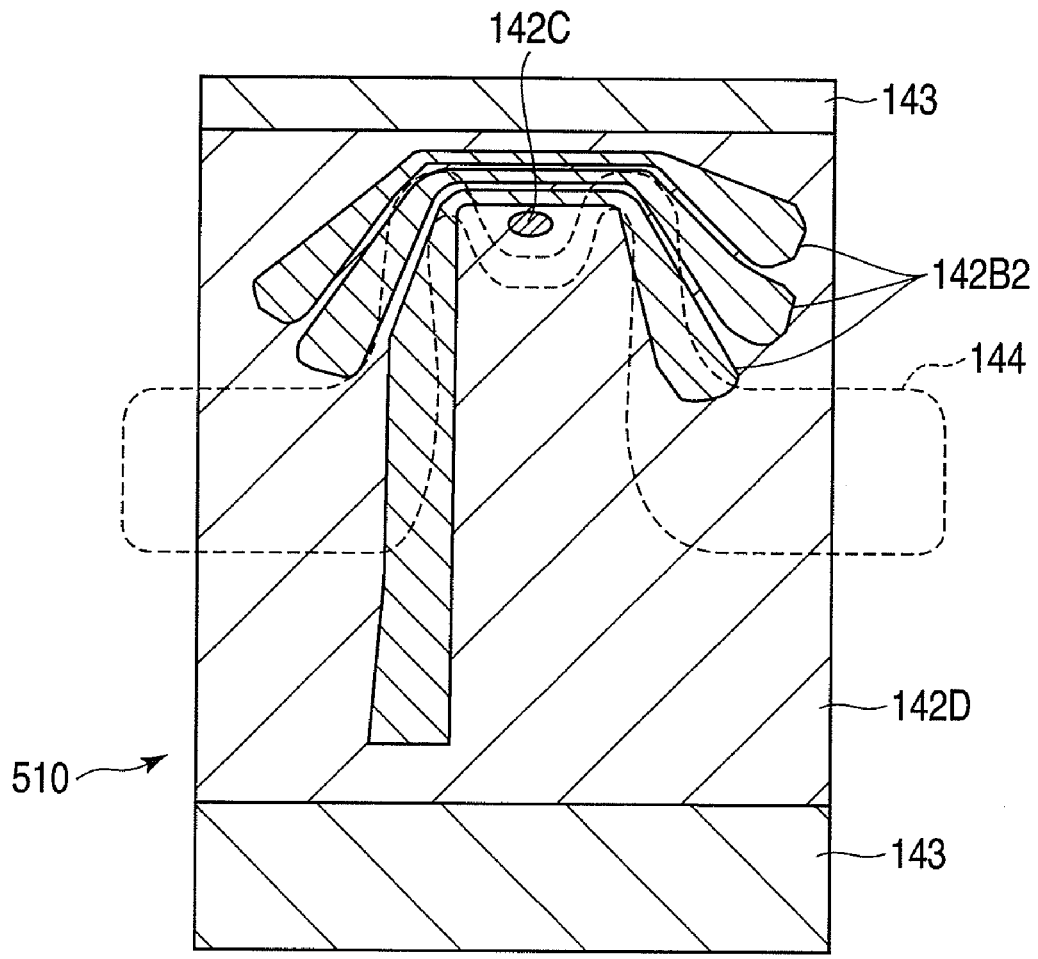
FIG. 6 is an exemplary sectional view of the magnetic head taken along line VI-VI of FIG. 5B and from the outflow side.

A magnetic head according to Comparative Example will now be described before describing the nonmagnetic member 145 in detail. FIG. 5B is a sectional view showing an internal configuration of a magnetic head 510 according to Comparative Example, and FIG. 6 is a sectional view of the head 510 taken along line VI-VI of FIG. 5B. The magnetic head 510 of this Comparative Example is constructed so that the nonmagnetic member 145 is removed from the inflow-side coil layer 140B. Other configurations of the magnetic head 510 are the same as those of the magnetic head 140 of the present embodiment, so that like reference numbers are used to designate those configurations, and a detailed description thereof is omitted. Thus, in the magnetic head 510 of Comparative Example, an inflow-side coil layer 510A is not provided with the nonmagnetic member 145.

If a heater 144 of the magnetic head 510 is powered to produce heat, the interior of the head 510, especially the part in which the heater 144 is located, is heated. Consequently, the head 510 undergoes thermal deformation around the location of the heater 144.

Figure 5A:
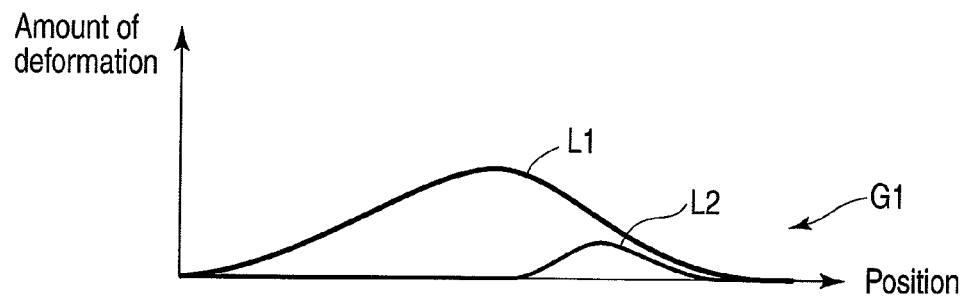
FIG. 5A is an exemplary diagram showing the distribution of the amount of deformation of a magnetic head according to Comparative Example.

FIG. 5A shows a graph G1 illustrating how the magnetic head 510 is thermally deformed as the heater 144 is powered, based on the distribution of the amount of deformation of a disk-side end face 510B. In the graph G1, the ordinate represents the amount of deformation of the disk-side end face 510B, and the abscissa represents the position on the end face 510B. A first line L1 in the graph G1 represents the distribution of the amount of deformation of the end face 510B attributable to the aforementioned thermal deformation.

As indicated by the first line L1, the distribution of the amount of deformation is in the shape of a mountain with its peak in the location of the heater 144. The higher the power supplied to the heater 144, the higher the peak of the mountain-like shape is. In the magnetic head 510 of this Comparative Example, the flying height is adjusted by suitably adjusting the power supplied to the heater 144 based on the thermal deformation.

If the power supplied to the heater 144 is not higher than a certain level, the thermal deformation that is caused depending on its level is canceled when the power supply is stopped. If the power supplied to the heater 144 becomes high, however, the end face 510B may be plastically deformed in the following manner.

In the magnetic head 510 of this Comparative Example, as shown in FIG. 6, the heater 144 adjoins the resist resin 142D in the no-coil region of the inflow-side coil layer 510A. Thus, the resist resin 142D is heated directly by heat produced by the heater 144. The thermal expansion coefficient of a conventional resist resin quickly increases if its glass transition temperature is exceeded. The glass transition temperature of the conventional resist resin ranges from 130 to 200° C.

In the magnetic head 510, as shown in FIG. 5B, the outflow side of the yoke 142C thinly extends on the disk-side end face 510B to the vicinity of the main magnetic pole 142A.

If the temperature of the resist resin 142D that faces the heater 144 in the aforementioned manner exceeds the glass transition temperature, the degree of expansion of the resist resin 142D increases at a stroke. Consequently, a stress that acts on a thinly extending portion 142C2 of the yoke 142C on the end face 510B from within the magnetic head 510 increases by a large margin. If the portion 142C2 is subjected to a stress heavier than the yield point of Permalloy that forms the yoke 142C, it is plastically deformed. If such plastic deformation occurs, a protrusion (residual PTP) inevitably remains on a part of the magnetic head 510 after the power supply to the heater 144 is stopped.

The graph G1 of FIG. 5A also includes a second line L2 that represents the distribution of the amount of deformation of the end face 510B attributable to the residual PTP. As indicated by the second line L2, the residual PTP is formed centering around the portion 142C2 on the end face 510B of the yoke 142C.

The residual PTP serves to reduce an unadjusted flying height before the power supply. If the residual PTP is too large, therefore, an allowance (heater stroke) cannot be secured for the adjustment based on the thermal deformation by the heater 144, so that the adjustment becomes impossible. The higher the power supplied to the heater 144, the larger the residual PTP is. Accordingly, an upper limit is provided for the power supplied to the heater 144, in order to suppress the residual PTP.

In the magnetic head 510 of Comparative Example, as described above, the resist resin 142D is heated directly by the heater 144, so that glass transition easily occurs in the heated part. In this magnetic head 510, therefore, the upper limit for the supplied power to suppress the residual PTP is set to be relatively low.

The flying height that depends on an air-bearing surface of a slider 520 on which the magnetic head 510 is mounted varies according to each head because of manufacturing errors. According to the adjustment of the flying height based on the heating by the heater 144, this variation in the flying height attributable to the manufacturing errors can be eliminated. If the original flying height before the thermal deformation is great, however, the variation may not be able to be eliminated by supplied power lower than the upper limit. In many cases, those magnetic heads whose flying height variations are too great to be eliminated by supplied power lower than the upper limit are discarded as defective products. Since the upper limit for the supplied power for the magnetic head 510 of Comparative Example is set to be relatively low, as mentioned before, the yield rate is inevitably reduced.

In the magnetic head 140 according to the present embodiment, as shown in FIGS. 3 and 4, on the other hand, the inflow-side coil layer 140B is provided with the nonmagnetic member 145 in order to suppress the residual PTP relative to the power supplied to the heater, thereby increasing the upper limit for the supplied power.

In the present embodiment, the heat produced by the heater 144 is transmitted to the resist resin 142D via the nonmagnetic member 145. Consequently, the temperature increase of the resist resin 142D can be reduced compared to the case of Comparative Example in which the heat is transmitted directly to the resist resin 142D. In the present embodiment, moreover, the nonmagnetic member 145 occupies a large part of the no-coil region in the coil layer 140B that adjoins the heater 144 and is easily heated to a relatively high temperature. As a result, the quantity of the resist resin 142D that thermally expands to a considerable degree at a temperature higher than the glass transition temperature is reduced at the part susceptible to high temperature. Thus, in the present embodiment, an internal stress in the magnetic head 140, which is attributable to the thermal expansion of the resist resin 142D at the temperature higher than the glass transition temperature, can be suppressed even if the heat transmitted from the heater 144 is somewhat substantial. Accordingly, the stress acting on the portion 142C2 that thinly extends on the disk-side end face 510B of the yoke 142C to the vicinity of the main magnetic pole 142A can also be suppressed.

In the present embodiment, as mentioned before, furthermore, the nonmagnetic member 145 is formed of a nonmagnetic material, such as alumina or copper. Consequently, a magnetic influence on the read and write elements 141 and 142 can be avoided. The material of the nonmagnetic member 145 is not limited to alumina or copper that is used in the present embodiment, and may be some other nonmagnetic material, such as silicon carbide, tungsten, silicon nitride, aluminum nitride, or molybdenum.

In the present embodiment, the nonmagnetic member 145 is shaped after the heater 144. The nonmagnetic member 145, having this shape, occupies most of that part of the no-coil region in the coil layer 140B which is easily heated to high temperature. Consequently, the quantity of the resist resin 142D that thermally expands to a considerable degree at a temperature higher than the glass transition temperature can be suppressed further effectively.

This indicates that the aforementioned basic form is surpassed by the applied form in which the transition-reluctant portion is shaped after the heater. The heater 144 of the present embodiment also corresponds to an example of the transition-reluctant portion in the applied form.

As mentioned before, the stress acting on the portion 142C2 that thinly extends on the disk-side end face 510B of the yoke 142C to the vicinity of the main magnetic pole 142A is suppressed. Consequently, the aforementioned residual PTP that is caused by this stress is suppressed relative to the power supplied to the heater 144. If the residual PTP can be thus suppressed, then it can be said the magnetic head 140 of the present embodiment has a heater stroke greater than that of the magnetic head 510 of Comparative Example.

In the magnetic head 140, the upper limit for the power supplied to the heater 144 is higher than that for the magnetic head 510 of Comparative Example. According to the magnetic head 140, therefore, the flying height can be adjusted based on the great heater stroke, although the flying height before the heating by the heater 144, which depends on an air-bearing surface of the slider 150, is somewhat great. Since the upper limit for the supplied power is set to be relatively high in the magnetic head 140 of the present embodiment, moreover, a satisfactory yield rate can be obtained.

The following is a description of a magnetic head of an HDD according to a second embodiment.

The second embodiment differs from the first embodiment in the construction of the nonmagnetic member in the coil layer. In the following paragraphs, differences between the first and second embodiments will mainly be described. Like reference numbers are used to designate like portions of the two embodiments, and a detailed description thereof is omitted. The following description will be made with reference to FIG. 1 that shows the HDD 100 of the first embodiment, if necessary.

FIG. 7 is a sectional view similar to FIG. 4, showing a magnetic head 300 of the second embodiment. As shown in FIG. 7, nonmagnetic members 301 without a glass transition temperature are disposed in three areas, including an area that is located near a yoke 142C and adjacent to a heater 144 and two areas that are located individually adjacent to wide portions of the heater 144 and off the yoke 142C.

Also in the present embodiment, the quantity of a resist resin 142D that is caused by heat from the heater 144 to thermally expand to a considerable degree at a temperature higher than the glass transition temperature is suppressed. As in the first embodiment, a residual PTP relative to power supplied to the heater 144 is suppressed. Consequently, a great heater stroke can be secured, so that the upper limit of the power supplied to the heater 144 can be set to be relatively high, and a satisfactory yield rate can be obtained.

In the present embodiment, moreover, the nonmagnetic members 301 that adjoin the two wide areas of the heater 144 function as heat spreaders for heat from the two areas. Therefore, transmission of heat from the heater 144 to the resist resin 142D can also be suppressed. Thus, the temperature increase of the resist resin 142D can be further reduced, and hence, the residual PTP relative to the power supplied to the heater 144 can be further suppressed.

This indicates that the aforementioned basic form is surpassed by the applied form in which the transition-reluctant portions are arranged in a plurality of areas adjacent to the heater. Each of the three nonmagnetic members 301 of the second embodiment is an example of the transition-reluctant portion in this applied form.

In the present embodiment, the nonmagnetic members 301 are formed of copper or the same material as that of conductor patterns 142B2, in particular. According to the present embodiment, therefore, the coil layer can be formed in such an efficient manner that the conductor patterns 142B2 and nonmagnetic members 301 are collectively formed from copper and the resist resin 142D is filled thereafter.

This indicates that the aforementioned basic form is surpassed by the applied form in which the transition-reluctant portions are formed of the same material as that of the conductor patterns. Each of the nonmagnetic members 301 of the present embodiment is an example of the transition-reluctant portion in this applied form.

The nonmagnetic members 301 are in contact with the conductor patterns 142B2. In starting information recording by means of the magnetic head 300, a current corresponding to information to be recorded is supplied to a coil 142B. Thereupon, the conductor patterns 142B2 that constitute the coil 142B produce heat, which may cause unexpected thermal expansion of the magnetic head 300, in some cases. In the present embodiment, the nonmagnetic members 301 in contact with the conductor patterns 142B2 serve also as heat sinks to radiate heat from the conductor patterns 142B2. Consequently, the unexpected thermal expansion attributable to the information recording is suppressed. This indicates that the aforementioned basic form is surpassed by the applied form in which the transition-reluctant portions are in contact with the conductor patterns. Further, each of the nonmagnetic members 301 is an example of the transition-reluctant portion in this applied form.

The following is a description of Examples corresponding to the embodiments described above.

The residual PTP was calculated by the finite element method based on material nonlinearity, for the magnetic head 140 of the first embodiment comprising the nonmagnetic member 145 of alumina, as First Example. In this calculation, the thermal conductivities of the resist resin and alumina were assumed to be 0.3 W/mK and 1.5 W/mK, respectively.

The residual PTP was calculated by the finite element method for the magnetic head 300 of the second embodiment comprising the nonmagnetic members 301 of copper in contact with the coil 142B, as Second Example. In this calculation, the thermal conductivities of the resist resin and copper were assumed to be 0.3 and 395 W/mK, respectively.

Further, the residual PTP was calculated by the finite element method for the magnetic head 510 of Comparative Example shown in FIGS. 5B and 6. In this calculation, the thermal conductivity of the resist resin was assumed to be 0.3 W/mK.

First, changes of the residual PTP relative to changes of the power supplied to the heater were calculated by the finite element method. FIG. 8 is a graph G2 showing the residual PTP changes relative to the supplied power changes for First Example and Comparative Example. In the graph G2 of FIG. 8, the ordinate represents the residual PTP, and the abscissa represents the power supplied to the heater. A dotted third line L3 in the graph G2 represents the change of the residual PTP for Comparative Example, while a solid fourth line L4 represents the change of the residual PTP for First Example. In the graph G2, change of the residual PTP for Second Example is not shown, since it has a tendency similar to that of the residual PTP change for First Example.

As indicated individually by the third and fourth lines L3 and L4, the residual PTP is substantially zero before certain threshold values P and P' are exceeded by the power supplied to the heater. Once the threshold values P and P' are exceeded by the supplied power, however, the residual PTP quickly increases as the power increases. This is because a stress acting on that part of the yoke which is located on an end face of the magnetic head is not heavier than the yield point of Permalloy that forms the yoke before the threshold values P and P' are exceeded by the supplied power. If the threshold values P and P' are exceeded by the supplied power, however, the internal stress attributable to the thermal expansion caused when the glass transition temperature is exceeded by the temperature of the resist resin in the coil layer exceeds the yield point at the aforementioned part, inevitably resulting in plastic deformation. The residual PTP is formed by this plastic deformation. After the glass transition temperature is exceeded, the thermal expansion coefficient of the resist resin quickly increases with the temperature increase. As indicated individually by the third and fourth lines L3 and L4, therefore, the residual PTP quickly increases with the increase of the power supplied to the heater after the threshold values P and P' are exceeded.

Comparison between the third and fourth lines L3 and L4 indicates that the threshold value P' for First Example is greater than the threshold value P for Comparative Example. This is because the quantity of the resist resin 142D obtained at a temperature higher than the glass transition temperature is suppressed by the nonmagnetic member 145 of alumina in First Example. Since the threshold value P' for the production of the residual PTP in First Example is greater than the threshold value P for the production of the residual PTP in Comparative Example, moreover, it can be seen that First Example enjoys a heater stroke greater than that of Comparative Example. This also applies to Second Example that is not illustrated in the graph G2 of FIG. 8.

Then, the residual PTP for the supplied voltage higher than the threshold value P for Comparative Example was calculated by the finite element method for each of the two Examples and Comparative Example. Table 1 below shows the result of the calculation.

TABLE 1

| | Temperature at area adjacent to heater | Residual PTP (nm) |
|---|---|---|
| Comparative Example | 239 | 1.96 |
| First Example (alumina) | 229 | 0.41 |
| Second Example (copper) | 209 | 0.44 |

Table 1 shows the temperature and residual PTP at an area of the coil layer adjacent to the heater obtained when the aforementioned high power is supplied to the heater, for each of the two Examples and Comparative Example. In First Example, as seen from Table 1, the temperature increase at the area adjacent to the heater and the residual PTP are reduced by 10° C. and 1.55 nm, respectively, compared to the case of Comparative Example. In Second Example, moreover, the temperature increase at the area adjacent to the heater and the residual PTP are reduced by 30° C. and 1.52 nm, respectively, compared to the case of Comparative Example. These values shown in Table 1 indicate that the first and second embodiments enjoy greater heater strokes. More specifically, with use of supplied power that produces a residual PTP greater than 1 nm in Comparative Example, the residual PTP can be made smaller than 0.5 nm in each of the two Examples.

Based on the great heat strokes, the upper limit of the power supplied to the heater can be set to be relatively high in each of Examples. The single nonmagnetic member 145 and three nonmagnetic members 301 in the coil layer have been given as an example of the transition-reluctant portions in the basic form. However, the transition-reluctant portions in the basic form are not limited to these members, and may alternatively be formed in any other number of areas that face the heater.

In connection with the embodiments described herein, moreover, the nonmagnetic members 145 and 301 that penetrate the coil layer 140B have been given as an example of the transition-reluctant portions in the basic form. However, the transition-reluctant portions in the basic form are not limited to these members, and may alternatively be formed by, for example, partially leaving a resist resin thicknesswise.

In connection with the embodiments described herein, the nonmagnetic member 145 formed of the nonmagnetic material without the glass transition temperature has been given as an example of the transition-reluctant portion in the basic form. However, the transition-reluctant portion in the basic form is not limited to this member, and may alternatively be formed of, for example, a resin having a glass transition temperature higher than that of the aforementioned resist resin.

While certain embodiments of the invention have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A magnetic head comprising:
    a magnetic pole layer comprising a magnetic pole along a layer;
    a coil layer attached to the magnetic pole layer and comprising a plurality of conductor patterns as a portion of a coil around the magnetic pole and a resin in a gap between the conductor patterns;
    a heater layer attached to the coil layer and comprising a heater in the heater layer via an area along a coil-forming region comprising the conductor patterns in the coil layer and an area along a non-coil region; and
    a transition-resistant portion in the non-coil region attached to the heater and either comprising a glass transition temperature higher than a transition temperature of the resin or not comprising any glass transition temperature.

2. The magnetic head of claim 1, wherein the transition-resistant portion is in each of a plurality of areas next to the heater.

3. The magnetic head of claim 1, wherein the transition-resistant portion comprises material of the conductor pattern.

4. The magnetic head of claim 1, wherein the transition-resistant portion is in contact with the conductor pattern.

5. The magnetic head of claim 2, wherein the transition-resistant portion is in contact with the conductor pattern.

6. An information storage device comprising:
    a storage medium; and
    a magnetic head configured to record information to the storage medium, the magnetic head comprising
    a magnetic pole layer comprising a magnetic pole along a layer;
    a coil layer attached to the magnetic pole layer and comprising a plurality of conductor patterns as a portion of a coil around the magnetic pole and a resin in a gap between the conductor patterns;
    a heater layer attached to the coil layer and comprising a heater in the heater layer via an area along a coil-forming region comprising the conductor patterns in the coil layer and an area along a non-coil region; and
    a transition-resistant portion in the non-coil region attached to the heater and either comprising a glass transition temperature higher than a transition temperature of the resin or not comprising any glass transition temperature.

7. The information storage device of claim 6, wherein the transition-resistant portion is in each of a plurality of areas next to the heater.

8. The information storage device of claim 6, wherein the transition-resistant portion comprises material of the conductor pattern.

9. The information storage device of claim 6, wherein the transition-resistant portion is in contact with the conductor pattern.

* * * * *